Patented May 28, 1940

2,202,579

UNITED STATES PATENT OFFICE 2,202,579

WOOD IMPREGNATING SOLUTION

Bror Olof Häger, Stockholm, Sweden, assignor to Bolidens Gruvaktiebolag, Stockholm, Sweden, a limited joint-stock company of Sweden No Drawing. Application November 4, 1937, Serial No. 172,854. In Sweden September 30, 1937

7 Claims. (Cl. 134—78.6)

In the impregnation of wood and other organic substances several different impregnating solutions have been employed, which possess in common that they contain bichromate besides preservatives. The intention with the presence of the bichromate is to obtain a fixation of the preservative by the precipitation of a substance difficult of solution in the fibrous material, which precipitation occurs in the reduction of the bichromate after the introduction of the solution into the material that is being impregnated.

With the use of these impregnation solutions it happens in some instances that the reduction of the bichromate occurs already on coming into contact with the material, i. e. before the solution has penetrated into the wood. This reduction then takes place, partly in the surface of the wood (respectively the surface of the material), and partly in that part of the solution itself which has not as yet penetrated into the wood because reducing substances are released from the wood. In this event a part of the preservative is precipitated, which takes place the more quickly the higher temperature, and the preservative thus precipitated is then not utilized for the purpose for which it is intended. Besides any precipitation produced in the solution causes difficulties in practical operations.

Furthermore, it happens that the reduction of the bichromate occurs already when the impregnation solution has only penetrated a minor part of the wood, so that the bulk of the preservative is precipitated in the outer parts of the wood, whereas the concentration in the inner parts of the wood does not become sufficient to give the intended protection. This entails, of course, unsatisfactory results.

The present invention has for object to prevent these disadvantages in the use of impregnation solutions of the said kind. The invention is mainly characterized thereby that these impregnation solutions also contain a small quantity of a strong oxidizing agent. The task of this oxidizing agent is in this connection to attack and break up some of the reducing substance which is solved out from the wood, so that the bichromate cannot be affected too soon. From this is seen that this agent should have a stronger oxidizing action than the bichromate itself. According to this method there is obtained remarkably good impregnation of materials, which with older processes can only imperfectly be impregnated with solutions of the kind here referred to without admixtures of oxidizing substances here stated.

The oxidizing agents added should be of such a nature that no deleterious products, such as acid or alkaline substances, are formed in their reduction. Nor must they attack the impregnation solution chemically, so that the same becomes less suitable for its purpose. As the oxidizing agents need only be added in very small quantities, approximately 0.1% of the weight of the solution, there is no risk of damaging the wood by their action.

As an example of oxidizing agents that can be used according to the present invention may be mentioned chlorates, permanganic acid, persulphates. In order to improve or enhance the action of these oxidizing agents some catalysts may also be added, e. g. osmium salts with the use of chlorates, or nitrate of silver with the use of persulphate. As examples of mixtures or solutions to which according to the present invention oxidizing agents and possibly catalysts, are added, the following may be mentioned:

1. $Na_2Cr_2O_7 + 2H_3AsO_4$ (or $2Na_2HAsO_4$)
2. $Na_2Cr_2O_7 + 3H_3AsO_4 + 2Na_2HAsO_4 + 3ZnSO_4$
3. $4Na_2Cr_2O_7 + H_3AsO_4 + 3CuSO_4$
4. $Na_2Cr_2O_7 + 10ZnCl_2$
5. $Na_2Cr_2O_7 + 3CuSO_4$

To these solutions intended for impregnation or mixtures in solid form are added the aforesaid oxidizing agents to a necessary quantity ascertained in each particular case by tests and experiments, e. g. 0.1% of the solution, when the oxidizing agent is present in the solution in amounts from 1% to 5% by weight based on the total chemical solids present in the solution.

Having thus described my invention I declare that what I claim is:

1. In a wood impregnating solution containing a wood preservative from the class consisting of arsenic acid, alkali metal salts of arsenic acid, and water soluble salts of zinc and copper together with a chromate fixing agent; a regulating agent selected from the class consisting of chlorates, persulphates and permanganates, said regulating agent being present in an amount not substantially greater than 5% of the weight of total chemical solids in the solution.

2. In a wood impregnating solution containing a wood preservative from the class consisting of arsenic acid, alkali metal salts of arsenic acid, and water soluble salts of zinc and copper together with a chromate fixing agent; a regulating agent selected from the class consisting of chlorates, persulphates and permanganates, said regulating agent constituting about 0.1% by weight of the solution.

3. In a wood impregnating solution containing a wood preservative from the class consisting of arsenic acid, alkali metal salts of arsenic acid, and water soluble salts of zinc and copper together with a chromate fixing agent; from about 1% to about 5% of a chlorate as a regulating agent based on the total chemical solids in the solution.

4. In a wood impregnating solution containing a wood preservative from the class consisting of arsenic acid, alkali metal salts of arsenic acid, and water soluble salts of zinc and copper together with a chromate fixing agent; from about 1% to about 5% of a permanganate as a regulating agent based on the total chemical solids in the solution.

5. In a wood impregnating solution containing a wood preservative from the class consisting of arsenic acid, alkali metal salts of arsenic acid, and water soluble salts of zinc and copper together with a chromate fixing agent; from about 1% to about 5% of a persulphate as a regulating agent based on the total chemical solids in the solution.

6. In a wood impregnating solution containing a wood preservative from the class consisting of arsenic acid, alkali metal salts of arsenic acid, and water soluble salts of zinc and copper together with a chromate fixing agent; from about 1% to about 5% of a chlorate based on the total chemical solids in the solution as a regulating agent together with a small amount of an osmium salt as a catalyst for the regulating agent.

7. In a wood impregnating solution containing a wood preservative from the class consisting of arsenic acid, alkali metal salts of arsenic acid, and water soluble salts of zinc and copper together with a chromate fixing agent; from about 1% to about 5% of a persulphate based on the total chemical solids in the solution as a regulating agent together with a small amount of silver nitrate as a catalyst for the regulating agent.

BROR OLOF HÄGER.